(12) United States Patent
Hirsch

(10) Patent No.: US 12,350,123 B2
(45) Date of Patent: Jul. 8, 2025

(54) SELF-LIGATING ORTHODONTIC BRACKET

(71) Applicant: Hirsch Dynamics Holding AG, Wollerau (CH)

(72) Inventor: Markus Hirsch, Wollerau (CH)

(73) Assignee: Hirsch Dynamics Holding AG, Wollerau (CH)

( * ) Notice: Subject to any disclaimer, the term of this patent is extended or adjusted under 35 U.S.C. 154(b) by 0 days.

(21) Appl. No.: 17/131,849

(22) Filed: Dec. 23, 2020

(65) Prior Publication Data
US 2022/0202537 A1    Jun. 30, 2022

(51) Int. Cl.
*A61C 7/28*    (2006.01)

(52) U.S. Cl.
CPC .................... *A61C 7/287* (2013.01)

(58) Field of Classification Search
CPC .. A61C 7/34; A61C 7/125; A61C 7/28; A61C 7/287; A61C 7/285; A61C 7/30
See application file for complete search history.

(56) References Cited

U.S. PATENT DOCUMENTS

| | | | |
|---|---|---|---|
| 5,275,557 A | | 1/1994 | Damon |
| 5,429,500 A | | 7/1995 | Damon |
| 5,439,378 A | | 8/1995 | Damon |
| 5,466,151 A | * | 11/1995 | Damon ................. A61C 7/287 433/10 |
| 10,660,729 B2 | | 5/2020 | Lopes |
| 10,758,324 B2 | | 9/2020 | Payne et al. |
| 2004/0170942 A1 | * | 9/2004 | Heiser ................. A61C 7/30 433/11 |
| 2014/0134562 A1 | * | 5/2014 | Wu ................. A61C 7/287 433/11 |
| 2017/0007370 A1 | * | 1/2017 | Ni ................. A61C 7/287 |

(Continued)

FOREIGN PATENT DOCUMENTS

| | | | | |
|---|---|---|---|---|
| DE | 10 2018 115 871 A1 | | 1/2020 | |
| WO | WO-2014018095 A1 | * | 1/2014 | ............ A61C 7/287 |
| WO | 2019/150257 A1 | | 8/2019 | |

OTHER PUBLICATIONS

Partial International Search Report dated Apr. 13, 2022 in PCT/EP2021/086790 (which was attached to the Invitation to Pay Additional Fees and, Where Applicable, Protest Fee mailed Apr. 13, 2022).

*Primary Examiner* — Cris L. Rodriguez
*Assistant Examiner* — Sydney J Pulvidente
(74) *Attorney, Agent, or Firm* — COLLARD & ROE, P.C.; William Collard

(57) ABSTRACT

A self-ligating orthodontic bracket has a bracket body having a mesial-distal arch wire slot extending in a labial direction of the bracket body, a base with a bonding surface and a channel oriented essentially perpendicular to the arch wire slot. There is at least one covering door for occluding the arch wire slot in a closed position and opening the arch wire slot in an open position. The at least one covering door is slidably coupled to the bracket body and is essentially linearly moveable between the closed position and the open position. There is at least one securing device orientated essentially parallel to the arch wire slot. The at least one securing device is completely arranged within the orthodontic bracket, completely enclosed by the bracket body and the at least one covering door in the closed position, the open position and in all intermediate positions.

20 Claims, 3 Drawing Sheets

(56) References Cited

U.S. PATENT DOCUMENTS

Figure 1A:
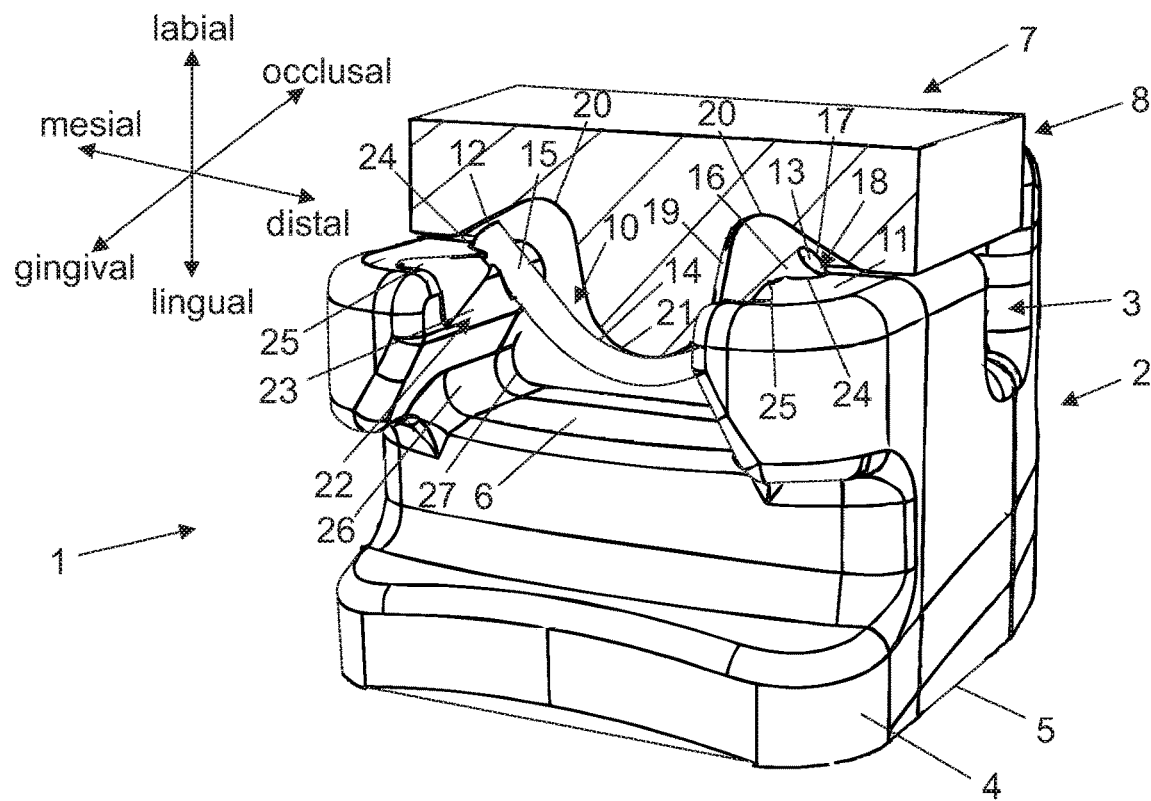

| | | |
|---|---|---|
| 2017/0135787 A1 | 5/2017 | Lopes |
| 2017/0245963 A1* | 8/2017 | Hirsch .................. A61C 7/287 |
| 2020/0330190 A1* | 10/2020 | Kwon .................. A61C 7/287 |
| 2020/0345462 A1 | 11/2020 | Lopes |
| 2021/0113306 A1 | 4/2021 | Albert |

* cited by examiner

SELF-LIGATING ORTHODONTIC BRACKET

BACKGROUND OF THE INVENTION

The present invention relates to a self-ligating orthodontic bracket comprising a bracket body having an arch wire slot as well as a base, at least one covering door suitable for occluding the arch wire slot and at least one securing device. The present invention further relates to a method for assembling a self-ligating orthodontic bracket.

A self-ligating orthodontic bracket is shown in WO 2019/150257 A1, whereby a latch mechanism is used in the form of a beam extending in a mesial-distal direction across a portion of an opening of a bracket body perpendicular to a sliding direction of a covering door to fix a closed position in which an arch wire slot is occluded. The covering door is secured by the beam in an occlusal-gingival direction, whereby the covering door occludes the beam in a labial direction by surpassing the beam with the help of a deflecting protrusion of the covering door.

A disadvantage of the prior art pursuant to a first aspect is that the beam has to be inserted into the bracket body in the mesial-distal direction, whereby in practice it can be tedious to maneuver the beam into the opening, especially if there is little space around the orthodontic bracket as e.g. for treatments of molar teeth. Moreover, an assembly and disassembly is uncomfortable due to the hidden placement of the beam inside the bracket body and hence, trained technical staff and specific tools are required to reach the beam. Due to the opening of the bracket body, impurities can enter the orthodontic bracket and harm the latch mechanism, whereby in addition food leftovers can interlock with the opening of the bracket body.

A disadvantage of the prior art pursuant to a second aspect is that the at least one covering door requires elaborate geometries for surpassing the beam, whereby especially with respect to laborious processing of material of the covering door manufacturing costs are high. Besides that, if forces act on the covering door in the closed position in a gingival direction, the covering door can undesirably move (in particular by the play between the covering door and the bracket body) from a closed position into an open position, in which an arch wire can move out of the arch wire slot.

A disadvantage of the prior art pursuant to a third aspect is that a high play between the covering door and the bracket body is required to be able to surpass the beam to reach the closed position, whereby a tight fit is not possible and impurities tend to reach an interior area of the orthodontic bracket as well.

SUMMARY OF THE INVENTION

It is an object pursuant to a first aspect of the invention to develop a self-ligating orthodontic bracket that is easy and economical to fabricate, easy to assemble and comprises a user-friendly approach to reliably secure the at least one covering door in the closed state and/or the open state. Additionally, it is an object pursuant to a second aspect of the invention to state an improved method for assembling an orthodontic bracket including increased flexibility and/or enhanced comfort in an installation of the orthodontic bracket, whereby in particular a method for rearranging the orthodontic bracket is improved.

The object pursuant to the first aspect is accomplished by a self-ligating bracket having at least one securing device that is completely arranged within the orthodontic bracket, completely enclosed by the bracket body and the at least one covering door in the closed position, the open position and in all intermediate positions.

During an initial assembling of the orthodontic bracket, the at least one securing device is surrounded by the at least one covering door and the bracket body completely, wherein a pollution of the securing mechanism during treatment is effectively prevented and the functionality of the securing device is maintained. Once the orthodontic bracket is assembled, the at least one securing device is hidden inside the orthodontic bracket, whereby an aesthetic appearance of the orthodontic bracket is enhanced which can be essential e.g. for patients with customer contact.

It is possible to hide the at least one securing device inside the orthodontic bracket so that it is not visible in the open position, closed position and in all intermediate positions. If the bracket body and/or the at least one covering door are translucent or transparent, the at least one securing device can be adapted by a specific coating and/or material to essentially restore an invisibility of the at least one securing device.

The object pursuant to the first aspect is also accomplished by a self-ligating bracket having at least two engagement positions for the at least one securing device, whereby the at least two engagement positions are separated from one another in an occlusal-gingival direction, whereby one engagement position corresponds to the open position and the other engagement position corresponds to the closed position, wherein the at least one securing device is movable between the at least two engagement positions by a movement of the at least one covering door along the channel.

Hence, a lifetime of the at least one covering door and the at least one securing device can be enhanced, as the forces for rearranging the orthodontic bracket can be transferred to the bracket body which can be easier constructed more robust in comparison to a locking mechanism that interacts solely between the covering door and the securing device. Moreover, a design of the bracket body and the at least one securing device can be held simple, wherein an aesthetic appearance of the orthodontic bracket can be improved (solely the at least one covering door and the bracket body have to be visible). In a preferred embodiment, the orthodontic bracket including the securing mechanism consists merely of the three separate components: bracket body, covering door and securing device. Other constructional configurations are possible as well.

The object pursuant to the first aspect is also accomplished by a self-ligating bracket having at least one securing device that is essentially rod-shaped or in the form of a curved rod and compressible in a mesial-distal direction to allow sliding movement of the at least one securing device between the closed position and the open position.

A positive effect of this locking mechanism with respect to an interaction between the at least one covering door and the at least one securing device is that the at least one covering door does not require complex constructional designs for securing the at least one covering door in the closed position and/or the open position. Thus, manufacturing costs—in particular of the at least one covering door—can be decreased significantly. A notch in the at least one covering door to place the at least one securing device inside the notch can be sufficient for instance.

In the present disclosure a coordinate system is used which is attached to a labial tooth surface on the mandible. This is not to be understood in a limiting way. The invention can be practiced irrespective of the position of the tooth and irrespective of the tooth surface. By way of example, a self-ligating orthodontic bracket according to the invention could also be used with a labial or lingual surface of a tooth of the maxilla.

A self-ligating orthodontic bracket according to the invention will have the following pairs of direction:
lingual-labial
mesial-distal
gingival-occlusal The object pursuant to the second aspect is accomplished by a method for assembling such a self-ligating orthodontic bracket, in which at least one covering door is partially inserted in the channel of the bracket body from a gingival to an occlusal direction, the at least one securing device is arranged onto the at least one covering door inside at least one notch in a labial direction and the at least one covering door is moved into the open position, wherein the at least one securing device secures the at least one covering door in an occlusal-gingival direction in the open position in a first engagement position.

The first engagement position can be defined for example via a first indent on an outer surface of the bracket body in which the at least one securing device can be at least partially arranged. A required force to overcome the first engagement position in occlusal direction can be for example defined by slopes of flanks of the first indent.

During contacting of the at least one securing device with the at least one covering door by the lingual movement of the at least one securing device the at least one securing device can be compressed or rather bended in a mesial-distal direction—e.g. initiated by an interaction with a notch of the at least one covering door to enable an occlusal movement of the at least one covering door together with the at least one securing device.

The features with respect to the orthodontic bracket with at least one completely hidden securing device, the orthodontic bracket, whereby the at least one securing device is movable by a movement of the at least one covering door, or the orthodontic bracket with the at least one compressible securing device are combinable with one another.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the at least one covering door comprises at least one notch, the at least one notch extending in a lingual direction, whereby the at least one securing device is arranged at least partially inside the at least one notch, whereby the at least one notch secures the at least one securing device in a labial direction in the closed position and the open position, whereby the at least one covering door occludes the at least one securing device exhaustively in the labial direction.

The at least one notch can be capable of allowing a compression or rather bending of the at least one securing device in a mesial-distal direction—e.g. initiated by indents of the bracket body for a transition between the open position and the closed position and vice versa. The at least one notch can be capable of securing the at least one securing device in a mesial-distal direction from a fall out of the at least one securing device as well.

Particularly preferred is that the at least one securing device is arranged completely within the at least one notch. Particularly preferred is that the at least one covering door extends in a mesial-distal direction completely across the bracket body. This feature can be used to further decrease pollution of the orthodontic bracket but has not to be the case in general.

The at least one notch can constitute a barrier in the labial direction for the at least one securing device, whereby a fall out of the at least one securing device is prevented and a shift of the at least one securing device in gingival-occlusal direction is feasible as well by bending the at least one securing device inside the at least one notch for instance.

Moreover, the at least one notch hides the at least one securing mechanism, wherein an aesthetic appearance of the orthodontic bracket is enhanced and the orthodontic bracket gets less polluted during treatment and improving the aesthetic appearance as the notch can be hidden from an outer face of the orthodontic bracket.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the at least one covering door is securable by the at least one securing device in the open position and in the closed position in the gingival direction and the occlusal direction.

The positioning of the at least one securing device along the bracket body—e.g. to arrange the at least one securing device in one of the at least two engagement positions on an outer surface of the bracket body—is initiated by a movement of the at least one covering door along the channel, the at least one covering door carries along the at least one securing device along the bracket body.

In some embodiments, it can be provided that the at least one securing device is suitable to secure the at least one covering door in an occlusal-gingival direction in the closed position or the open position.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the bracket body comprises at least two engagement positions for the at least one securing device on an outer surface of the bracket body, whereby the at least two engagement positions are separated from one another in an occlusal-gingival direction, whereby one engagement position corresponds to the open position and the other engagement position corresponds to the closed position.

The at least two engagement positions can define the closed position and the open position for the at least one covering door or the at least one securing device for example via a first indent and a second indent. The at least one covering door can occlude the outer surface of the bracket body such that the at least one securing device is completely hidden inside the orthodontic bracket.

An engagement position can, for example, comprise a stop to prevent a movement beyond the open position in gingival direction and/or beyond the closed position in occlusal direction. An engagement position can, for example, comprise a flank with a slope designed to allow movement of the at least one covering door between the open position and the closed position with a defined amount of required force with respect to a geometry of the at least one securing device and/or the engagement position (which can be constituted exemplarily by an indent with certain slopes).

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the at least one covering door is arranged in the channel of the bracket body and the channel comprises an opening in a labial direction, the at least one covering door extending through the opening along two side walls of the opening.

It is particularly preferred the two side walls are essentially parallel orientated along the opening.

With the help of the opening, the at least one covering door is movable along the channel manually in occlusal-gingival direction by gripping the at least one covering door in lingual direction, whereby the two side walls secure the at least one covering door in mesial-distal direction. The side walls can act as rails for the movement of the at least one covering door and constitute the opening of the channel.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that one or both of the two side walls comprises a first indent for arranging the at least one securing device at least partially within the first indent to secure the at least one covering door in the occlusal-gingival direction in the closed position, or one or both of the two side walls comprises a second first indent for arranging the at least one securing device at least partially within the second indent to secure the at least one covering door in the occlusal-gingival direction in the open position.

It is particularly preferred provided that two first indents are arranged opposite to each other and facing each other in a mesial-distal direction. It is particularly preferred provided that two second indents are arranged opposite to each other and facing each other in a mesial-distal direction.

The at least one first indent and/or the at least one second indent preferably extends from the side wall to an upper surface of a tie-wing of the bracket body, whereby the at least one securing mechanism can be preferably located either in the at least one first indent or in the at least one second indent to secure the at least one covering door in the occlusal-gingival direction by positive form locking and/or traction. Tie-wings are usually used to apply bands to the orthodontic bracket.

The indents are used to serve as defined engaging states for the at least one securing device to secure the at least one covering door in the closed position and the open position. If the indents are convexly shaped, an adaption to specific requirements and/or geometries is possible easily.

In general it is possible to secure the at least one securing device on the outer surface against slipping by fastening means or specific friction properties for instance.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that a slope of the at least one second indent in an occlusal direction is lower compared to a slope of the at least one first indent in a gingival direction.

The slopes are related to the flanks of the indents and define an amount of force which is required to bend the at least one securing device to overcome the open position or the closed position. A movement of the at least one covering door from the open position into the closed position is preferred easier to achieve than vice versa to enable a secure orthodontic bracket during treatment. The slopes are particularly preferred underneath 90° with respect to the occlusal-gingival direction and/or above 30° or 45°. The indents can be shaped in a V-form and/or be rounded. An embodiment with an indent merely as a hard stop and an indent with a V-form of certain slopes can be used for instance.

It is preferred that the at least one first indent and/or the at least one second indent comprise a flank which acts as an insuperable stop for the at least one securing device to limit the movement of the at least one securing device in the closed position and/or the open position, whereby it is particularly preferred, that the flank is essentially orthogonal with respect to the occlusal-gingival direction.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the bracket body comprises at least one depression along the arch wire slot for insertion of a tool inside the at least one depression to move the at least one covering door from the closed position to the open position.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the channel comprises at least one recess in a mesial-distal direction, whereby the at least one covering door is arranged in the at least one recess, the at least one covering door being movable between the closed position and the open position along the at least one recess in an occlusal-gingival direction.

It is particularly preferred that the at least one recess is concavely curved and the at least one covering door comprises at least one convexly curved outer face corresponding to the at least one recess.

A dovetail-connection of the at least one covering door and the bracket body with two recesses or similar are particularly preferred for a movement of the at least one covering door along the channel.

In some embodiments, the at least one covering door comprises exactly two curved outer faces, wherein an interaction with exactly two recesses prevent the at least one covering door from falling off the bracket body or undesirable movement in a lingual direction and/or enable occlusal-gingival movements of the at least one covering door. If the two curved outer faces are connected to each other by a plane, a wedging tendency during movement of the at least one covering door is reduced—e.g., by a support of the bracket body on the plane.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the at least one covering door fills the whole channel essentially completely along an occlusal-gingival extension of the at least one covering door except for the at least one notch.

Essentially completely means that a certain extent of play can be required for movement of the at least one covering door along the channel. A positive effect is the tight fit of the at least one covering door on the bracket body.

In the embodiments with respect to the orthodontic bracket with at least one completely hidden securing device, the at least one securing device is movable by a movement of the at least one covering door, or for the orthodontic bracket with the at least one compressible securing device it is preferably provided that the at least one securing device is arranged in a plane spanned by a mesial-distal direction and a labial-lingual direction, whereby the at least one securing device
- is curved in the plane in the labial-lingual direction and comprises two free ends, a first free end and a second free end enclosing a blunter angle in a labial direction, or
- is symmetrical with respect to the labial-lingual direction and comprises a concavely bent section, whereby it the concavely bent section borders a first straight section and a second straight section, whereby the first straight section includes the first free end and the second straight section includes the second free end.

Due to the curvature in the plane an improved arrangement on the bracket body is achievable, whereby in general it is also possible to use a straight securing device, which is arranged e.g. in grooves on the outer surface of the bracket body. Moreover, a rearrangement of the at least one securing device can more easily be generated by a bending movement of the at least one securing device relative to the at least one covering door in the mesial-distal direction—induced by a movement of the at least one covering door or an interaction with the engagement positions or rather indents.

By the concavely bent section, the securing device can act as a spring, whereby manufacturing process dependent tolerances can be compensated and if needed, the at least one covering door can be in addition be brought into contact with the at least one securing device in a labial direction more comfortable in an assembling process for instance.

The securing device is preferably elastically deformable and/or flexibly bendable with respect to the concavely bent section, whereby in a movement of the at least one covering door the at least one securing device acts as a spring to enable a securement of the at least one covering door in the open position and/or the closed position and a force-induced movement between the open position and the closed position by elastically bending—in particular in a mesial-distal direction.

In the embodiments with respect to the orthodontic bracket with at least one completely hidden securing device the orthodontic bracket whereby the at least one securing device is movable by a movement of the at least one covering door, or the orthodontic bracket with the at least one compressible securing device, it is preferably provided that the at least one notch comprises at least one indentation in a labial direction for arranging the at least one securing device at least partially within the at least one indentation.

In general, the at least one securing device is bendable in a mesial-distal and labial-lingual plane, whereby a mesial-distal compression can be combined with a labial-lingual enlargement of a labial-lingual extension of the at least one securing device.

In some embodiments, the at least one notch comprises a bulge in a lingual direction to secure the at least one securing device in the labial direction. Moreover, the bulge can act as a reference point for bending the at least one securing device.

It is particularly preferred that the at least one covering door is movable between the closed position and the open position by bending the at least one securing device in direction of the at least one indentation.

The bulge can be used to define a—in particular symmetrical—bending direction of the at least one securing device to bend the at least one securing device to a higher pronounced U-shape by compressing the at least one securing device inside an indentation via the bulge.

With the help of the at least one indentation and/or the bulge, a geometry of the at least one covering door can be adapted to the geometry of the at least one securing device.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that a circumference of the at least one securing device is essentially circular, oval or polygonal.

It is particularly preferred that a cross section is essentially equal over a mesial-distal extent of the at least one securing device. By spring force, the at least one securing device can be—particularly preferred in a lingual and/or mesial-distal direction—pressed against the bracket body, whereby a shifting of the at least one securing device along the bracket body can be prevented e.g. by indents. In general, a cross section can vary along the—particularly preferred bent—rod as the at least one securing device. Barrel-shaped securing devices or narrowing cross sections can be used as the at least one securing device for instance too.

A diameter of the at least one securing device is preferred to be between 0.05 mm and 0.3 mm, particularly preferred between 0.1 mm and 0.2 mm.

In the embodiments with respect to the orthodontic bracket with at least one completely hidden securing device, the orthodontic bracket whereby the at least one securing device is movable by a movement of the at least one covering door, or the orthodontic bracket with the at least one compressible securing device, it is preferably provided that the at least one securing device consists of metal or composite material or the bracket body or the at least one covering door is an injection-molded, a 3D-printed or a milled plastic, metal or ceramics part.

Injection-molded parts—in contrast to the prior art—have the advantage that manufacturing costs, manufacturing times and/or a weight of the orthodontic bracket can be reduced significantly. In general, the bracket body and/or the at least one covering door can be made of ceramics or metal for example also by other manufacturing process. A 3D-printed or milled bracket body and/or covering door are—if applicable in combination in the manufacturing process—possible as well, e.g. if geometries are particularly fine or complex, whereby plastic, metal and/or ceramics can be used as material in all three manufacturing processes.

It is particularly preferred the at least one securing device consists of metal—particularly preferred NiTi and/or Cr, or a composite material like glass fiber reinforced or fiber reinforced plastic, whereby friction properties and colors of the at least one securing device can be adapted to the requirement of the orthodontic bracket.

Preferably, the bracket body, the at least one covering door and/or the at least one securing device is designed transparent or translucent. If e.g. the at least one securing device is coated in white and the bracket body as well as the covering door are translucent, a chromatic distinction to the teeth of a patient can be reduced significantly.

The at least one securing device can be manufactured by extrusion and be cut to the desired length and/or bent with a curvature depending on the requirements of the orthodontic bracket. Due to the simplicity of the at least one securing device and the replacement thereof an adaption to changed requirements can be easily be implemented—e.g., by using distinct materials or diameters of the at least one securing device.

In a preferred embodiment of the invention with respect to assembling self-ligating orthodontic bracket it is provided that the at least one securing device is in the form of a rod prior to a contact with the bracket body and bent in a lingual direction during contacting the bracket body or curved in a labial-lingual and mesial-distal orientated plane prior to a contact with the bracket body.

The orthodontic bracket can be rearranged, whereby in the open position or the closed position the at least one securing device is bent in a mesial-distal direction, particularly preferably induced by a first indent or a second indent during an occlusal-gingival movement of the at least one covering door, the at least one covering door is moved between the closed position and the open position, whereby afterwards the at least one securing device bends back, particularly preferably by spring force, to secure the at least one covering door in an occlusal-gingival direction in the closed position or the open position, particularly preferably by the first indent or the second indent.

Thus, a transition between the closed position and the open position and vice versa can be performed fast and with few manual process steps.

It can be provided that a device is used to arrange the at least one securing device to the at least one covering door to facilitate the mounting process—e.g. by a device for receiving the at least one unbent and/or bent securing device. The device can be capable of bending the at least one securing device into the intended curvature for the orthodontic bracket, e.g. by a curvature of the device that receives the unbent or pre-bent rod.

The features of the claims of the orthodontic bracket and the method for assembling the orthodontic bracket can be transferred to each other mutatis mutandis.

BRIEF DESCRIPTION OF THE DRAWNGS

Figure 1B:
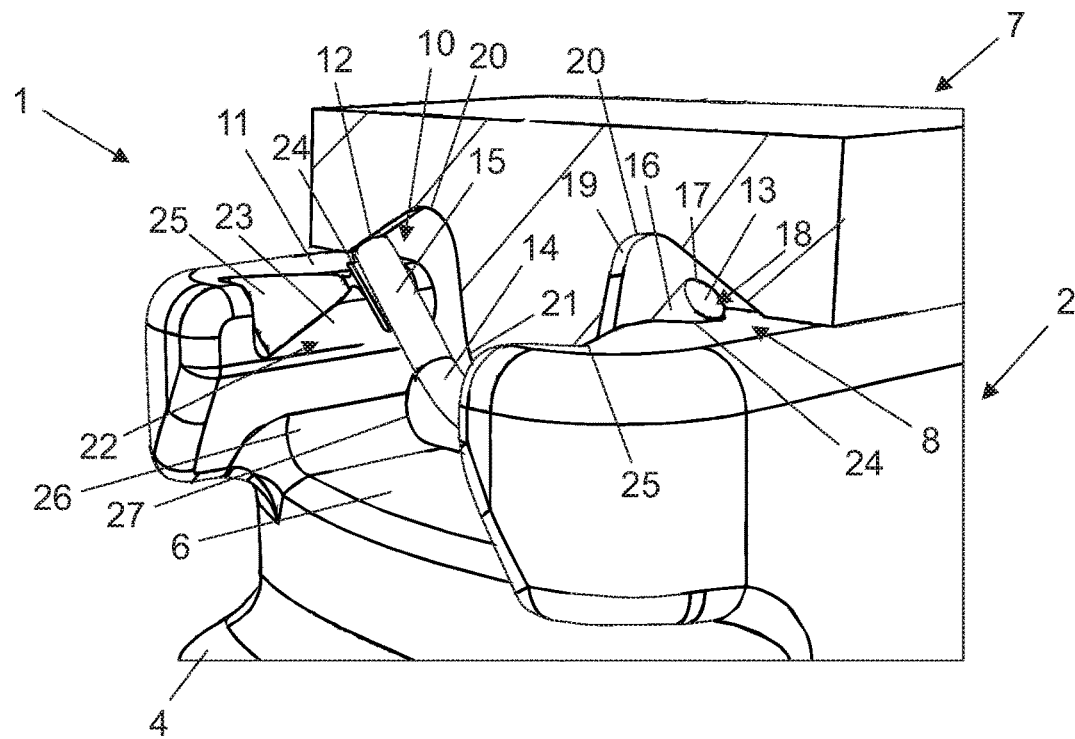
Figure 2A:
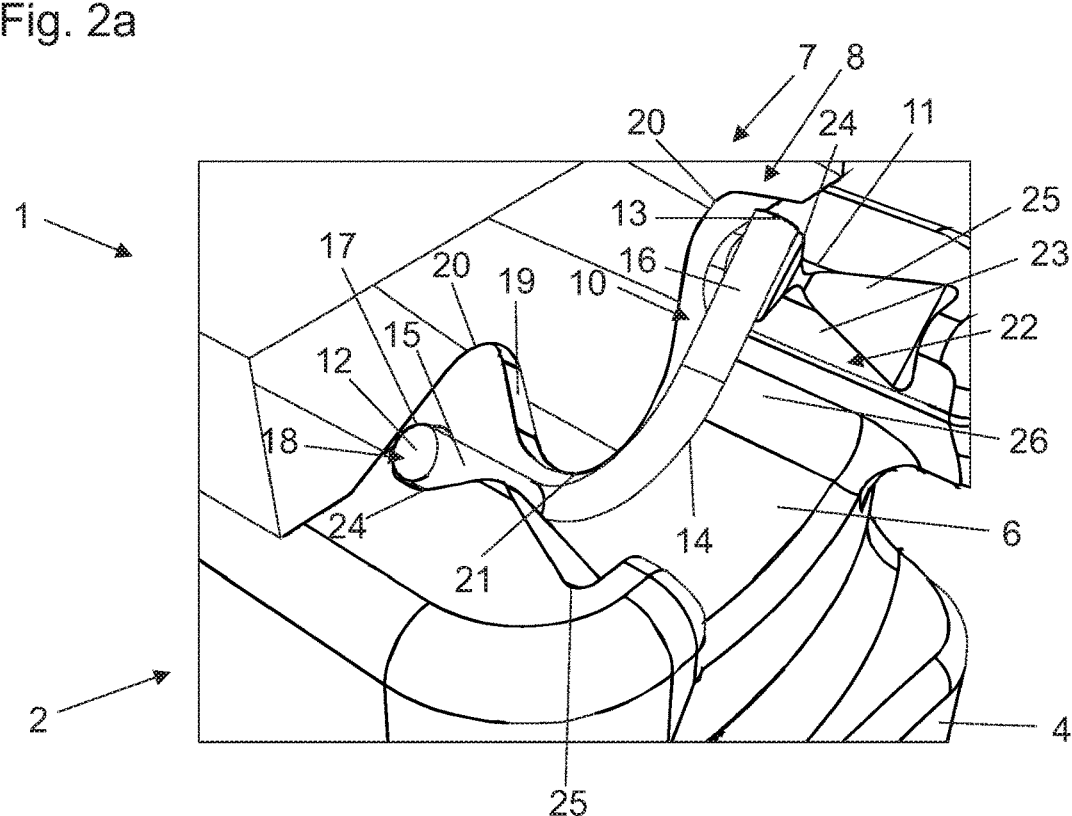
Figure 2B:
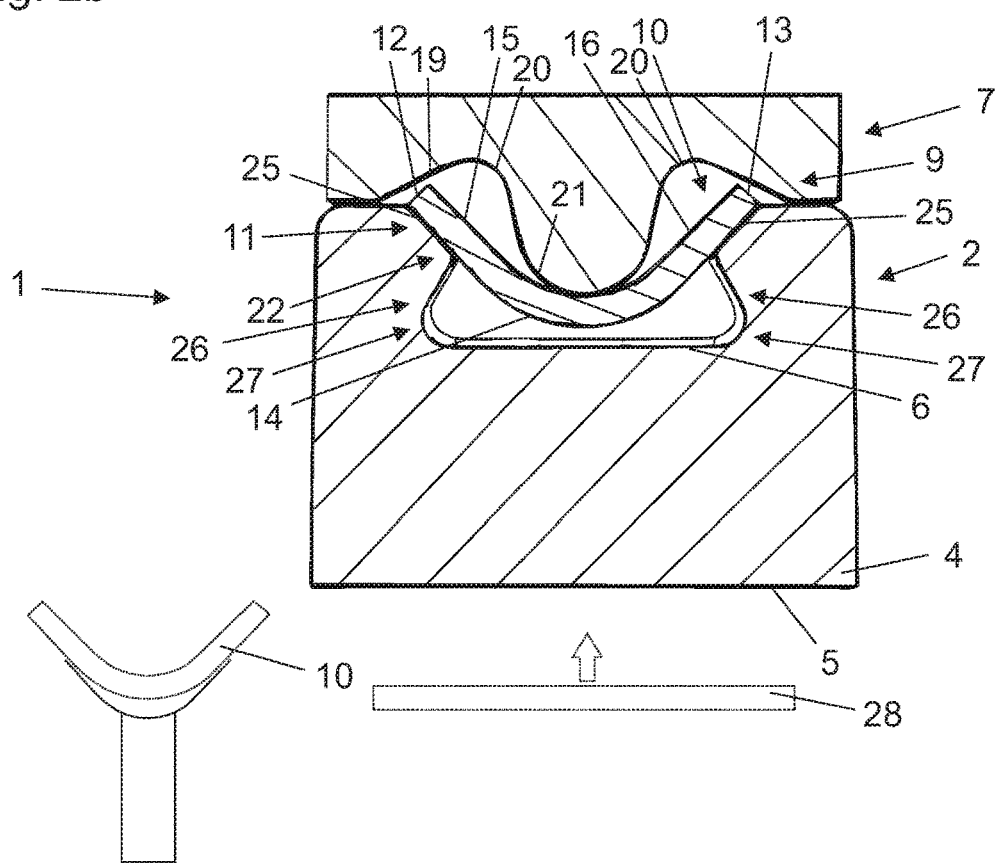
Figure 3A:
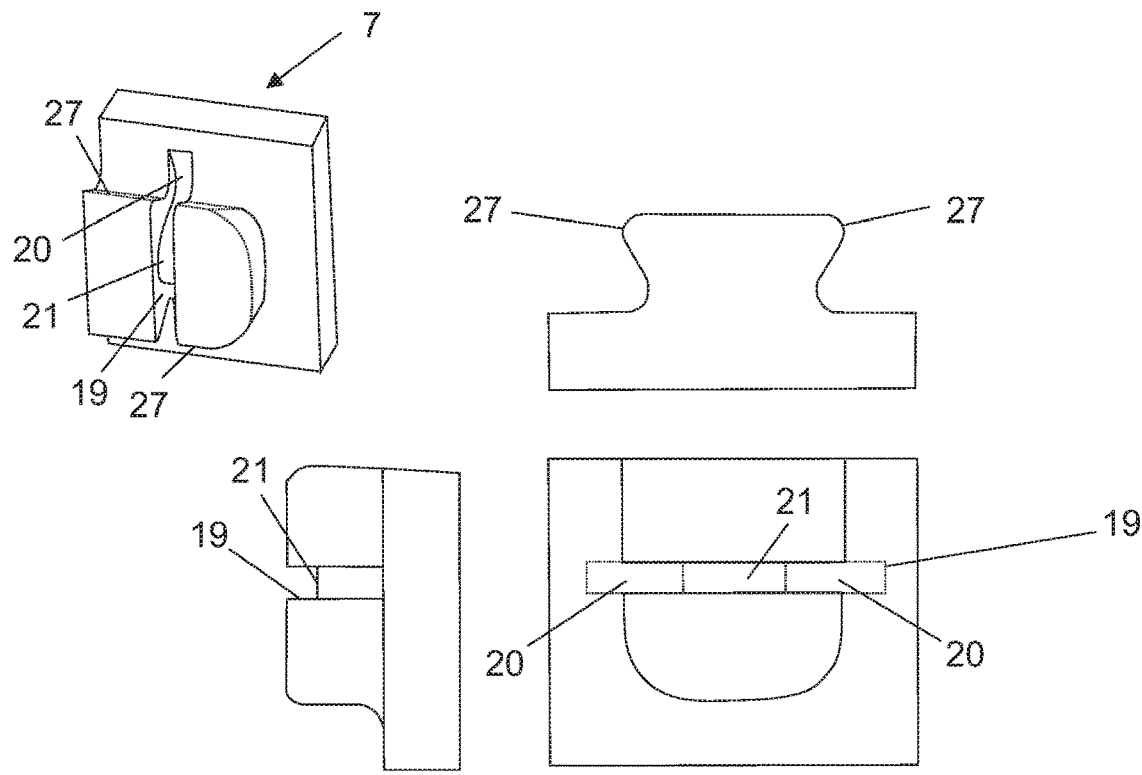
Figure 3B:
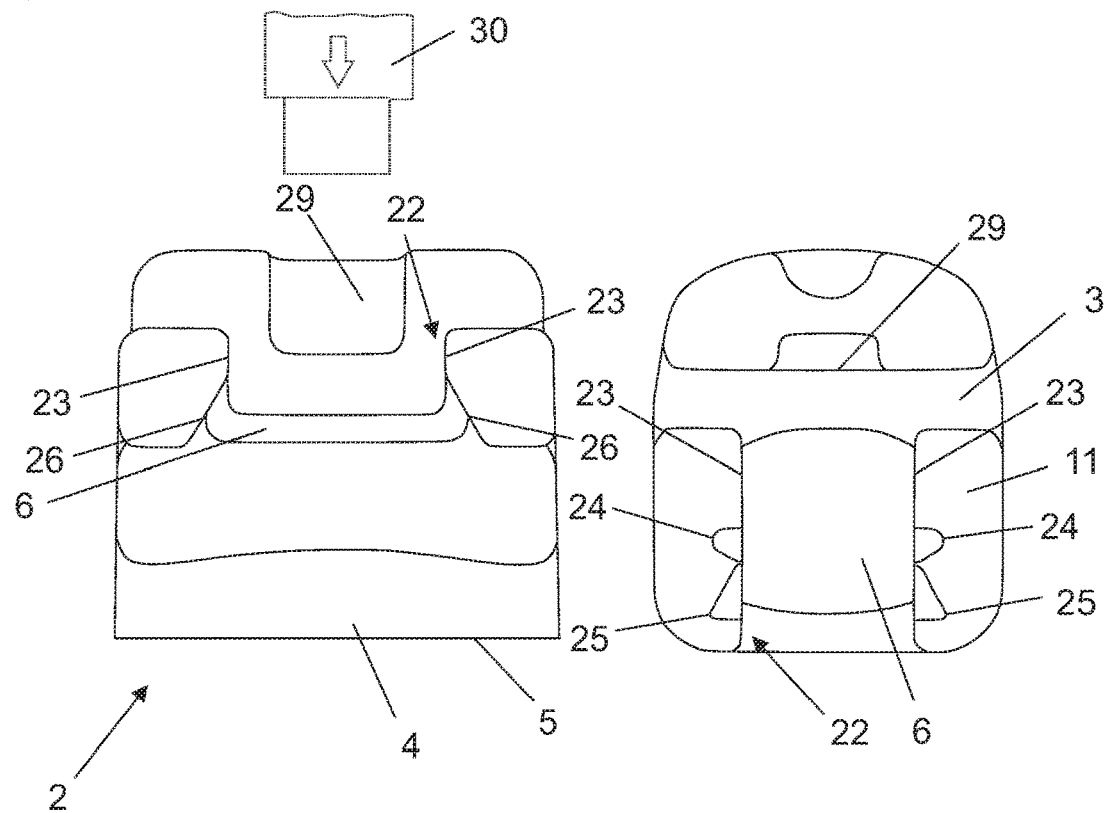

Further details and advantages of the present invention are explained in more detail below with reference to the description of the figures and with reference to the exemplary embodiments illustrated in the drawings. In the drawings, the figures show:

FIG. 1a a self-ligating orthodontic bracket according to a preferred embodiment, whereby a covering door is secured by a securing device in the closed position in a perspective view, whereby the covering door is cut in the representation to disclose the securing device, FIG. 1b an enlarged section of the orthodontic bracket pursuant to FIG. 1a in a perspective view, FIG. 2a an enlarged section of the orthodontic bracket pursuant to FIG. 1a in a perspective view with a different line of vision with respect to FIG. 1b, FIG. 2b a schematic sectional view of the orthodontic bracket pursuant to FIG. 1a with a mesial-distal and labial-lingual section plane through the securing device with a line of vision in an occlusal direction, FIG. 3a a covering door as used in the orthodontic bracket pursuant to FIG. 1a in three orthogonal views and a perspective view, FIG. 3b a bracket body as used in the orthodontic bracket pursuant to FIG. 1a in a front view and a view from the top.

DETAILED DESCRIPTION OF THE EMBODIMENTS

FIG. 1 shows a self-ligating orthodontic bracket 1, the orthodontic bracket 1 comprising a bracket body 2 having a mesial-distal arch wire slot 3 extending in a labial direction of the bracket body 2. The orthodontic bracket 1 comprises a base 4 with a bonding surface 5 and a channel 6 oriented perpendicularly to the arch wire slot 3.

A covering door 7 is connected to the bracket body 2 which is suitable to occlude the arch wire slot 3 in a closed position 8 and to allow access to the arch wire slot 3 in an open position 9 (cf. FIG. 2b). The covering door 7 is cut in half behind the securing device 10 in a mesial-distal and labial-lingual plane in occlusal direction to disclose the securing device 10 that is hidden in the orthodontic bracket 1 once assembled so that the securing device 10 is exhaustively enclosed within the orthodontic bracket 1. The covering door 7 is slidably coupled to the bracket body 2, whereby the covering door 7 is linearly moveable between the closed position 8 and the open position 9 of the covering door 7. The covering door 7 is arranged in the channel 6 of the bracket body 2, whereby the channel 6 comprises an opening 22 in a labial direction and the covering door 7 extends through the opening 22 along two parallel side walls 23 of the opening 22.

The securing device 10 is restricted in the labial direction by the covering door 7, wherein the securing device is bendable in mesial-distal direction with an enlargement of the extension in the labial-lingual direction. It is also possible to allow—in particular only—movements in labial direction to be able to move the covering door 7 between the closed position 8 and the open position 9. The securing device 10 is built as a one-piece securing device 10. The securing device 10 is in the form of a bent rod 28, whereby in general a cross section can vary along the securing device 10.

The securing device 10 is completely arranged within the orthodontic bracket 1, completely enclosed by the bracket body 2 and the covering door 7 on top of the securing device 10 in the closed position 8, the open position 9 and in all intermediate positions.

The orthodontic bracket 1 comprises two engagement positions for the securing device 10 that are defined by two indents 24, 25. The two engagement positions are separated from one another in an occlusal-gingival direction, whereby one engagement position corresponds to the open position 9 and the other engagement position corresponds to the closed position 8, wherein the securing device 10 is movable between the two engagement positions by a movement of the covering door 7 along the channel 6. The engagement positions are arranged on an outer surface 11 of the bracket body 2.

The securing device 10 is rod-shaped or in the form of a curved rod 28 and compressible in a mesial-distal direction to allow sliding movement of the securing device and the covering door between the closed position 8 and the open position 9.

The orthodontic bracket 1 comprises the securing device 10, whereby the securing device 10 is orientated parallelly to the arch wire slot 3. The securing device 10 is arranged on an outer surface 11 of the bracket body 2 such that the covering door 7 is secured by the securing device 10 in an occlusal-gingival direction in the closed position 8 or the open position 9, dependent on the position of the securing device 10 on the outer surface 11.

The securing device 10 can easily be removed from the shown location on the outer surface 11 and again be placed on a different location on the outer surface 11, e.g. to enable the covering door 7 to move from the closed position 8 in which an arch wire is fixed in the arch wire slot 3 to the open position 9 in which the arch wire can be replaced. To enable this transition, the covering door 7 is shifted with force along the channel 6, whereby the securing device 10 bends inside a notch 19 of the covering door 7 to cancel the securement of the covering door 7. By spring force, the securing device 10 is again pressed against the bracket body 2 to restore the securement in the open position 9 or the closed position 8. Intermediate positions are conceivable as well.

To prevent the covering door 7 from falling out of the bracket body 2, the securing device 10 can secure the covering door 7 in the open position 9, whereby after replacing the arch wire the covering door 7 can move again into the closed position 8, whereby the covering door 7 is secured in the closed position 8 by placing the securing device 10 again in the shown location on the outer surface 11 inside two first indents 24. This is done internally in the orthodontic bracket 1 without requiring direct access to the securing device 10 that is completely hidden inside the orthodontic bracket 1.

The covering door 7 is securable by the securing device 10 in the open position 9 and in the closed position 8 in the occlusal-gingival direction by two engagement positions as securing positions of the securing device 10 along the outer surface 11 in the occlusal-gingival direction.

The securing device 10 is curved in a lingual direction and comprises two free ends 12, 13, a first free end 12 and a second free end 13 enclosing a blunter angle in a labial direction.

FIG. 1b shows the securing mechanism enlarged. A circumference 17 of the securing device 10 is circular. In general, the circumference 17 can also be of an oval or a polygonal shape—e.g. in form of a rectangular rod 28 that is bent. A cross section 17 of the securing device 10 is equal over a mesial-distal extent of the securing device 10 along the curved geometry of the securing device 10.

The covering door 7 comprises a notch 19 (cf. FIG. 3a), whereby the notch 19 secures the securing device 10 in a labial direction from an undesired removal of the orthodontic bracket 1, wherein the securing device 10 remains movable by orthodontic staff to rearrange the covering door 7 along the outer surface 11 of the bracket body 2.

In the closed position 8, the covering door 7 occludes the arch wire slot 3 in general exhaustively, whereby the covering door 7 particularly preferably contacts a bracket bar along the arch wire slot 3 in occlusal direction and the notch 19 secures the securing device 10 labially by exhaustive protrusion of the securing device 10 in gingival direction. Embodiments without an exhaustive protrusion or with an access that is occluded by the bracket body 2 are conceivable as well to exhaustively enclose the securing device 10 inside the orthodontic bracket 1.

In the open position 9, the covering door 7 does at most partially occlude the arch wire slot 3 so that a replacement of the arch wire is possible, wherein the covering door 7 notch 19 secures the securing device 10 labially by exhaustive protrusion of the securing device 10 in gingival direction. A movement of the covering door 7 from the open position 9 into the closed position 8 along the channel 6 is possible and requires less force acting on the covering door 7 or rather the securing device 10 as from the closed position 8 into the open position 9.

In the open position 9 and the closed position 8, it is preferred that the covering door 7 contacts the securing device 10 but this does not need to be the case. The covering door 7 extends exhaustively in a mesial-distal direction across the bracket body 2 for reduced pollution of the orthodontic bracket 1.

The securing device 10 consists of metal, an alloy or composite material. The bracket body 2 and the covering door 7 are injection-molded plastics parts, whereby in general also merely the bracket body 2 or the covering door 7 can be built as an injection molded part. The bracket body 2 and the covering door 7 can consist e.g. of metal and/or ceramics as well. A manufacturing process with respect to the bracket body 2 and/or the covering door 7 by milling and/or 3D-printing is possible as well.

FIG. 2a shows the enlarged securing mechanism from a different perspective. The notch 19 comprises two indentations 20 in the labial direction for arranging the two free ends 12, 13 within the two indentations 20. The notch 19 comprises a bulge 21 in a lingual direction to secure the securing device 10 in the labial direction, whereby the covering door 7 is movable between the closed position 8 and the open position by bending one or both free ends 12, 13 in direction of the indentations 20.

Both of the two side walls 23 comprise a first indent 24 for arranging the securing device 10 partially within the first indent 24 to secure the covering door 7 in the occlusal-gingival direction in the closed position 8. The two first indents 24 are arranged opposite to each other and facing each other in a mesial-distal direction.

Both of the two side walls 23 comprise a second first indent 25 for arranging the securing device 10 partially within the second indents 25 to secure the covering door 7 in the occlusal-gingival direction in the open position 9. The two second indents 25 are arranged opposite to each other and facing each other in a mesial-distal direction.

Exemplarily, the orthodontic bracket 1 can be assembled in the following way: The covering door 7 is partially inserted in the channel 6 of the bracket body 2 from a gingival to an occlusal direction through the channel 6, the securing device 10 is attached to the covering door 7, in particular by placing the securing device 10 inside the notch 19 in a labial direction, the covering door 7 is moved to the open position 9, wherein the securing device 10 is arranged onto the outer surface 11 of the bracket body 2 and the securing device 10 secures the covering door 7 in the occlusal-gingival direction in the open position 9—e.g. by positive form locking in occlusal-gingival direction between the securing device 10 and the bracket body 2 and the securing device 10 and the covering door 7.

Exemplarily, the assembled orthodontic bracket 1 can be rearranged in the following way: In the open position 9 or the closed position 8 the securing device 10 is bent in a mesial-distal direction—induced by the interaction of the movement of the covering door 7 and the securing device in the first indent 24 or the second indent 25 during an occlusal-gingival movement of the covering door 7—and the covering door 7 is moved between the closed position 8 and the open position 9 or vice versa, whereby afterwards the securing device 10 bends back (e.g. in the first indents 24 or the second indents 25 depending on the desired position of the covering door 7) to secure the covering door 7 in the occlusal-gingival direction in the closed position 8 or the open position 9.

Securing the covering door 7 in the occlusal-gingival direction can prevent the covering door 7 from exceeding the open position 9 and/or the closed position 8 by a barrier, whereby a movement of the covering door 7 between the open position 9 and closed position 8 is possible with sufficient force acting on the securing device 10 (securing the covering door 7 in usual forces during treatment). A movability of the covering door 7 can depend therefore on the position of the securing device 10 along the outer surface 11 or in which indents 24, 25 the securing device 10 is arranged.

The covering door 7 fills the whole channel 6 completely along an occlusal-gingival extension of the covering door 7 expect for the notch 19 and a play allowing movement of the covering door 7 between the closed position 8 and the open position 9.

FIG. 2b shows a cross section of the orthodontic bracket 1, whereby it can be seen that the securing device 10 is symmetrical with respect to a labial-lingual direction and comprises a concavely bent section 14. The concavely bent section 14 borders a first straight section 15 and a second straight section 16, whereby the first straight section 15 includes the first free end 12 and the second straight section 16 includes the second free end 13.

The channel 6 comprises two recesses 26 in a mesial-distal direction, whereby the covering door 7 is arranged in the two recesses 26, wherein the covering door 7 is movable between the closed position 8 and the open position 9 and vice versa along the two recesses 26 in an occlusal-gingival direction, if the securing device 10 does not prevent this movement. The two recesses 26 are concavely curved and the covering door 7 comprises two convexly curved outer faces 27 corresponding to the two recesses 26, viz. the covering door 7 is secured by the bracket body 2 in a labial-lingual direction (due to the channel 6).

The securing device 10 is arranged onto the covering door 7 in a bent form in lingual direction prior to a contact with the bracket body 2 by a device that is schematically indicated in the bottom left corner of FIG. 2b. It is also possible that the securing device 10 is in the form of a rod 28 prior to a contact with the bracket body 2 as indicated with dashed lines and bent in a lingual direction during contacting the bracket body 2. In general, the device can be shaped in a way to receive the rod 28 for attaching it to the covering door 7.

FIG. 3a discloses a covering door 7 without a cut for illustration. The covering door comprises a notch 19, the notch 19 extending in a lingual direction, whereby the at securing device 10 is arranged exhaustively inside the notch 19 during assembly and/or treatment. The notch 19 exceeds the convex outer face 27 of the covering door 7 but that has not to be the case in general.

FIG. 3b discloses a bracket body 2 for the orthodontic bracket 1, whereby it can be seen that a slope of a flank of the second indents 25 in an occlusal direction is lower compared to a slope of a flank of the first indents 24 in a gingival direction to enable an easier transition from the open position 9 to the closed position 8 than vice versa.

The bracket body 2 comprises a depression in an extension of the arch wire slot 3 for inserting a tool 30 that can be used to shift the covering door 7 in gingival direction from the closed position 8 to the open position 9 easier. The shape of the depression is in general arbitrary. Preferred is a depression with an essential rectangular cross-section.

A passage between the channel 6 and the arch wire slot 3 comprises a step to securely fix the arch wire inside the arch wire slot in the closed position 8. The step is not necessary in general.

LIST OF REFERENCE SIGNS 1 self-ligating orthodontic bracket
2 bracket body
3 arch wire slot
4 base
5 bonding surface
6 channel
7 covering door
8 closed position
9 open position
10 securing device
11 outer surface
12 first free end
13 second free end
14 concavely bent section
15 first straight section
16 second straight section
17 circumference
18 cross section
19 notch
20 indentation
21 bulge
22 opening
23 side wall
24 first indent
25 second indent
26 recess
27 outer face
28 rod
29 depression
30 tool

What is claimed is:

1. A self-ligating orthodontic bracket, comprising:
   a bracket body having a mesial-distal arch wire slot extending in a labial direction of the bracket body, a base with a bonding surface and a channel oriented essentially perpendicular to the arch wire slot,
   at least one covering door configured for occluding the arch wire slot in a closed position and opening the arch wire slot in an open position, wherein the at least one covering door is slidably coupled to the bracket body, the at least one covering door being essentially linearly moveable between the closed position and the open position of the at least one covering door and
   at least one securing device, the at least one securing device having a longitudinal axis and wherein said longitudinal axis is orientated essentially parallel to the arch wire slot,
   wherein the at least one securing device is completely arranged within the orthodontic bracket, and is completely enclosed by the bracket body and the at least one covering door in the closed position, the open position, and in all intermediate positions;
   wherein the bracket body comprises at least two engagement positions for the at least one securing device on an outer surface of the bracket body, wherein the at least two engagement positions are separated from one another in an occlusal-gingival direction, wherein one engagement position corresponds to the open position and the other engagement position corresponds to the closed position;

wherein the at least one covering door comprises at least one notch, the at least one notch extending in a lingual direction, wherein the at least one securing device is arranged at least partially inside the at least one notch, wherein the at least one notch secures the at least one securing device in a labial direction in the closed position and the open position, wherein the at least one covering door occludes the at least one securing device exhaustively in the labial direction.

2. The orthodontic bracket according to claim 1, wherein the at least one covering door is securable by the at least one securing device in the open position and in the closed position in a gingival direction and an occlusal direction.

3. A method for assembling a self-ligating orthodontic bracket according to claim 1, comprising the steps of:
partially inserting the at least one covering door in the channel of the bracket body from a gingival to an occlusal direction,
arranging the at least one securing device onto the at least one covering door inside at least one notch in a labial direction, and
moving the at least one covering door into the open position, wherein the at least one securing device secures the at least one covering door in an occlusal-gingival direction in the open position in a first engagement position.

4. A self-ligating orthodontic bracket, comprising:
a bracket body having a mesial-distal arch wire slot extending in a labial direction of the bracket body, a base with a bonding surface and a channel oriented essentially perpendicular to the arch wire slot,
at least one covering door configured for occluding the arch wire slot in a closed position and opening the arch wire slot in an open position, wherein the at least one covering door is slidably coupled to the bracket body, the at least one covering door being essentially linearly moveable between the closed position and the open position of the at least one covering door along a plurality of intermediate positions and
at least one securing device, the at least one securing device being orientated essentially parallel to the arch wire slot, wherein the at least one securing device is configured to secure the at least one covering door in an occlusal-gingival direction in the closed position and/or the open position,
wherein the orthodontic bracket comprises at least two engagement positions for the at least one securing device, wherein the at least two engagement positions are separated from one another in an occlusal-gingival direction, wherein one engagement position corresponds to the open position and the other engagement position corresponds to the closed position, wherein the at least one securing device is movable between the at least two engagement positions by a movement of the at least one covering door along the channel wherein the at least one covering door is arranged in the channel of the bracket body and the channel comprises an opening in a labial direction, the at least one covering door extending through the opening along two side walls of the opening;
wherein the at least one covering door comprises at least one notch, the at least one notch extending in a lingual direction, wherein the at least one securing device is arranged at least partially inside the at least one notch, wherein the at least one notch secures the at least one securing device in a labial direction in the closed position and the open position, wherein the at least one covering door occludes the at least one securing device completely in the labial direction.

5. The orthodontic bracket according to claim 4, wherein the at least one securing device is configured to secure the at least one covering door in an occlusal-gingival direction in the closed position or the open position.

6. The orthodontic bracket according to claim 4, wherein the bracket body comprises the at least two engagement positions for the at least one securing device on an outer surface of the bracket body, wherein the at least two engagement positions are separated from one another in an occlusal-gingival direction, wherein one engagement position corresponds to the open position and the other engagement position corresponds to the closed position.

7. The orthodontic bracket according to claim 4, wherein the at least one covering door is arranged in the channel of the bracket body and the channel comprises an opening in a labial direction, the at least one covering door extending through the opening along two side walls of the opening.

8. The orthodontic bracket according to claim 7, wherein one or both of the two side walls comprises a first indent for arranging the at least one securing device at least partially within the first indent to secure the at least one covering door in the occlusal-gingival direction in the closed position, or
one or both of the two side walls comprises a second indent for arranging the at least one securing device at least partially within the second indent to secure the at least one covering door in the occlusal-gingival direction in the open position.

9. The orthodontic bracket according to claim 8, wherein a slope of at least one second indent in an occlusal direction is lower compared to a slope of at least one first indent in a gingival direction.

10. The orthodontic bracket according to claim 4, wherein the bracket body comprises at least one depression along the arch wire slot for insertion of a tool inside the at least one depression to move the at least one covering door from the closed position to the open position.

11. The orthodontic bracket according to claim 4, wherein the channel comprises at least one recess in a mesial-distal direction, wherein the at least one covering door is arranged in the at least one recess, the at least one covering door being movable between the closed position and the open position along the at least one recess in an occlusal-gingival direction.

12. A self-ligating orthodontic bracket, comprising:
a bracket body having a mesial-distal arch wire slot extending in a labial direction of the bracket body, a base with a bonding surface and a channel oriented essentially perpendicular to the arch wire slot,
at least one covering door configured for occluding the arch wire slot in a closed position and opening the arch wire slot in an open position, wherein the at least one covering door is slidably coupled to the bracket body, the at least one covering door being essentially linearly moveable between the closed position and the open position of the at least one covering door along a plurality of intermediate positions and
at least one securing device, the at least one securing device being orientated essentially parallel to the arch wire slot, wherein the at least one securing device is configured to secure the at least one covering door in an occlusal-gingival direction in the closed position and/or the open position,
wherein the at least one securing device is essentially rod-shaped or in the form of a curved rod and compressible in a mesial-distal direction to allow sliding movement of the at least one securing device between the closed position and the open position, wherein the at least one securing device is arranged in a plane spanned by a mesial-distal direction and a labial-lingual direction, wherein the at least one securing device is curved in the plane in the labial-lingual direction.

13. The orthodontic bracket according to claim 12, wherein the at least one covering door comprises at least one notch, the at least one notch extending in a lingual direction, wherein the at least one securing device is arranged at least partially inside the at least one notch, wherein the at least one notch secures the at least one securing device in the labial direction in the closed position and the open position, wherein the at least one covering door occludes the at least one securing device exhaustively in labial direction.

14. The orthodontic bracket according to claim 13, wherein the at least one covering door fills a whole channel essentially completely along an occlusal-gingival extension of the at least one covering door except for the at least one notch.

15. The orthodontic bracket according to claim 13, wherein the at least one notch comprises at least one indentation in a labial direction for arranging the at least one securing device at least partially within the at least one indentation or a bulge in a lingual direction to secure the at least one securing device in the labial direction, wherein the at least one covering door is movable between the closed position and the open position by bending the at least one securing device in a direction of the least one indentation.

16. The orthodontic bracket according to claim 12, wherein the at least one securing device is arranged in a plane spanned by a mesial-distal direction and a labial-lingual direction, wherein the at least one securing device
is curved in the plane in the labial-lingual direction and comprises two free ends comprising a first free end and a second free end enclosing a blunter angle in a labial direction, or
is symmetrical with respect to the labial-lingual direction and comprises a concavely bent section, wherein the concavely bent section borders a first straight section and a second straight section, wherein the first straight section includes the first free end and the second straight section includes the second free end.

17. The orthodontic bracket according to claim 12, wherein a circumference of the at least one securing device is essentially circular, oval or polygonal.

18. The orthodontic bracket according to claim 12, wherein the at least one securing device consists of metal or composite material or the bracket body or the at least one covering door is an injection-molded, a 3D-printed or a milled plastic, metal or ceramics part.

19. A self-ligating orthodontic bracket, comprising:
a bracket body having a mesial-distal arch wire slot extending in a labial direction of the bracket body, a base with a bonding surface and a channel oriented essentially perpendicular to the arch wire slot,
at least one covering door configured for occluding the arch wire slot in a closed position and opening the arch wire slot in an open position, wherein the at least one covering door is slidably coupled to the bracket body, the at least one covering door being essentially linearly moveable between the closed position and the open position of the at least one covering door and
at least one securing device, the at least one securing device having a longitudinal axis and wherein said longitudinal axis is orientated essentially parallel to the arch wire slot,
wherein the at least one securing device is completely arranged within the orthodontic bracket, and is completely enclosed by the bracket body and the at least one covering door in the closed position, the open position, and in all intermediate positions;
wherein the bracket body comprises at least two engagement positions for the at least one securing device on an outer surface of the bracket body, wherein the at least two engagement positions are separated from one another in an occlusal-gingival direction, wherein one engagement position corresponds to the open position and the other engagement position corresponds to the closed position;
one or both of the two side walls comprises a first indent for arranging the at least one securing device at least partially within the first indent to secure the at least one covering door in the occlusal-gingival direction in the closed position, or
one or both of the two side walls comprises a second indent for arranging the at least one securing device at least partially within the second indent to secure the at least one covering door in the occlusal-gingival direction in the open position.

20. A self-ligating orthodontic bracket, comprising:
a bracket body having a mesial-distal arch wire slot extending in a labial direction of the bracket body, a base with a bonding surface and a channel oriented essentially perpendicular to the arch wire slot,
at least one covering door configured for occluding the arch wire slot in a closed position and opening the arch wire slot in an open position, wherein the at least one covering door is slidably coupled to the bracket body, the at least one covering door being essentially linearly moveable between the closed position and the open position of the at least one covering door along a plurality of intermediate positions and
at least one securing device, the at least one securing device being orientated essentially parallel to the arch wire slot, wherein the at least one securing device is configured to secure the at least one covering door in an occlusal-gingival direction in the closed position and/or the open position,
wherein the orthodontic bracket comprises at least two engagement positions for the at least one securing device, wherein the at least two engagement positions are separated from one another in an occlusal-gingival direction, wherein one engagement position corresponds to the open position and the other engagement position corresponds to the closed position, wherein the at least one securing device is movable between the at least two engagement positions by a movement of the at least one covering door along the channel wherein the at least one covering door is arranged in the channel of the bracket body and the channel comprises an opening in a labial direction, the at least one covering door extending through the opening along two side walls of the opening;
wherein
one or both of the two side walls comprises a first indent for arranging the at least one securing device at least partially within the first indent to secure the at least one covering door in the occlusal-gingival direction in the closed position, or one or both of the two side walls comprises a second indent for arranging the at least one securing device at least partially within the second indent to secure the at least one covering door in the occlusal-gingival direction in the open position.

* * * * *